United States Patent Office 2,839,573
Patented June 17, 1958

2,839,573

CHEMICAL PROCESS FOR PRODUCING β-CHLORO ETHANE SULFONATES

Willard E. Catlin, Woodstown, and Alfred M. Jenkins, Pennsgrove, N. J., assignors to E. I. du Pont de Nemours and Company, Wilmington, Del., a corporation of Delaware No Drawing. Application September 6, 1956
Serial No. 608,207

6 Claims. (Cl. 260—513)

This invention relates to a process for the preparation of β-chloro ethane sulfonates. More particularly, this invention relates to a process of producing β-chloro ethane sulfonates by fusing carbyl sulfate with an alkali metal chloride.

It is known in the art that β-chloro ethane sulfonates may be prepared by the reaction of carbyl sulfate with aqueous concentrated hydrochloric acid at elevated temperatures and pressures. In this reaction, however, it is necessary to use expensive pressure equipment. A solvent is also necessary which complicates the subsequent purification of the product.

An object of the present invention is to provide a process for producing β-chloro ethane sulfonates from carbyl sulfate at atmospheric pressure conditions and without the use of solvents. A further object is the provision of such a process which is safe, convenient, and economical, and produces the desired sulfonate products in high yields which are easily purified. Other and additional objects will become apparent from a consideration of the following specification and claims.

We have found that our objects are achieved when we prepare β-chloro ethane sulfonates by fusing carbyl sulfate with an alkali metal chloride, such as sodium chloride, followed by neutralization of the reaction mass with an alkali metal or alkaline earth hydroxide, such as sodium hydroxide. The invention is illustrated by the following examples:

*Example 1*

A mixture of 37.6 g. (0.2 moles) of carbyl sulfate and 29.8 g. (0.4 mole) of potassium chloride was heated with stirring at 107–125° C. for 3¼ hours. The reaction product was dissolved in 50 ml. of water and the solution neutralized with aqueous 50% potassium hydroxide. The solution was evaporated to dryness under reduced pressure. The residue was extracted with hot alcohol and the alcoholic filtrate evaporated to dryness. A 66% yield (24.3 g.) of potassium β-chloro ethane sulfonate was obtained, based on the carbyl sulfate.

*Example 2*

Following the procedure of Example 1, the reaction was carried out at a maximum temperature of 195° C. Reaction time was 10 minutes. Conversion to potassium β-chloro ethane sulfonate (based on carbyl sulfate) was 90%.

*Example 3*

Following the procedure of Example 1, a mixture of 37.6 g. (0.2 mole) of carbyl sulfate and 21.4 g. (0.4 mole) of ammonium chloride was heated at 118–123° C. for 3¾ hours. A yield of 40% (13.0 g.) of ammonium β-chloro ethane sulfonate was obtained, based on the carbyl sulfate.

*Example 4*

A mixture of 37.6 g. (0.2 mole) of carbyl sulfate and 29.8 g. (0.4 mole) of potassium chloride was heated with stirring to 195° C.; 9 minutes elapsing to reach this temperature from room temperature. The reaction product was slurried in 125 ml. of boiling 2B alcohol and the solution neutralized with solid calcium hydroxide. The hot alcoholic solution was filtered and the precipitate extracted with hot alcohol. The combined filtrates were evaporated to dryness. An 88.5% yield (32.3 g.) of potassium β-chloro ethane sulfonate was obtained, based on the carbyl sulfate.

*Example 5*

A mixture of 37.6 g. (0.2 mole) carbyl sulfate and 23.4 g. (0.4 mole) of finely ground sodium chloride was heated with rapid stirring up to 190–195° whereupon solidification of the reaction mixture occurred. The reaction mixture was cooled to 70° C. and 70 ml. water added to the product. The solution was neutralized with aqueous 50% sodium hydroxide and then evaporated to dryness under reduced pressure. The residue was twice extracted with hot alcohol. The product crystallized from the cooled alcoholic extract and was separated by filtration. A 36% yield (12.0 g.) of sodium β-chloro ethane sulfonate was obtained, based on the carbyl sulfate. Analytical data indicated that the product consisted of a 2:1 mixture of sodium β-chloro ethane sulfonate/sodium ethylene sulfonate.

*Example 6*

The procedure of Example 3 was followed using a reaction mixture of 37.6 g. (0.2 mole) of carbyl sulfate and 46.8 g. (0.8 mole) sodium chloride. A yield of 43.2% (14.4 g.) of sodium β-chloro ethane sulfonate was obtained, based on the carbyl sulfate.

*Example 7*

A mixture of 37.6 g. (0.2 mole) carbyl sulfate, 11.7 g. (0.2 mole) sodium chloride, and 14.9 g. (0.2 moles) of potassium chloride was heated to 187°, 21 minutes being required to attain reaction temperature. The product was dissolved in 70 ml. of warm water and the solution was evaporated to dryness under reduced pressure, and the residue twice extracted with hot alcohol. The filtrate was evaporated to dryness. A yield of 30.2 g. of the sulfonate was obtained.

*Example 8*

The procedure was the same as that of Example 6. A mixture consisting of 37.6 g. (0.2 mole) carbyl sulfate, 7.5 g. (0.1 mole) potassium chloride, and 17.6 g. (0.3 mole) of sodium chloride, a yield of 29.0 g. of the sulfonate was obtained.

*Example 9*

A mixture of 37.6 g. (0.2 mole of carbyl sulfate and 17.0 g. (0.2 mole) of lithium chloride was heated to 200° C. The product was dissolved in 70 ml. water and neutralized with calcium hydroxide and filtered. The filtrate was evaporated to dryness under reduced pressure. The residue was extracted with hot alcohol, the filtrate chilled, and the precipitate removed by filtration. This filtrate was evaporated to dryness. A yield of 28 g. of the sulfonate was obtained.

Carbyl sulfate may be prepared in the well-known fashion by absorption of ethylene in liquid sulfur trioxide as described more particularly in Example 6 of U. S. Patent 2,572,605, issued October 23, 1951, to J. K. Fincke. While we do not wish to be limited to any one particular theory of reaction, our process is believed to proceed in accordance with the following reaction mechanism:

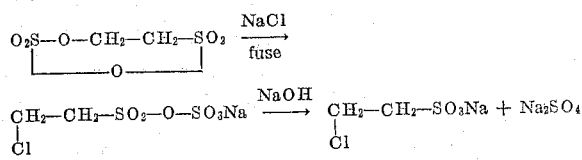

The molar ratio of salt to carbyl sulfate which we employ is preferably about 1:1. However, ratios higher than 1:1, for example 4:1 or more, are operable.

If a mixture of salts is used, for example sodium and potassium chlorides, the product obtained will also be a mixture. The same is true if the cation of the hydroxide differs from that of the salt. It is thus preferable to use a single salt and the hydroxide of the corresponding cation, as for example sodium. However, the neutralizing agent may be any alkali metal or alkaline earth oxide, hydroxide, or carbonate. If an alkaline earth metal neutralizing agent is used, the alkaline earth metal sulfate will precipitate out of the reaction mass, except in the case of magnesium compounds.

Pure carbyl sulfate melts at 80° C. and the reaction between carbyl sulfate and the salt commences at this temperature. The alkali metal chloride will dissolve in or fuse with the molten carbyl sulfate, thus eliminating the need for a solvent which complicates the ultimate purification of the product. Best yields are achieved at temperatures in the range of 190–195° C. At temperatures above about 195° C., dehydrohalogenation tends to occur, leading to the formation of ethylene sulfonates. The reaction product of sodium chloride and molten carbyl sulfate solidifies at about 195° C. and, for this reason, and because of its economic advantages, sodium chloride represents the preferred salt to be used.

As used in this application, alkali metal chloride is intended to include sodium, potassium, and lithium chlorides. Since the melting points of these compounds are well above the reaction temperatures of the process, it is unexpected that the sulfonate product is achieved. Lithium chloride melts at 613° C., potassium chloride at 776° C., sodium chloride at 801° C., and ammonium chloride sublimes at 335° C.

The β-chloro ethane sulfonates are useful compositions in numerous organic syntheses. For example, they are valuable etherifying agents in the sulfoethylation of cellulose compositions. Sulfoethyl cellulose ethers have a wide variety of industrial uses, including, for example, as water-loss retardants in hydraulic cements as shown in U. S. Patent 2,583,657, issued January 29, 1952, to J. P. Lea and H. B. Fisher.

Having thus described our invention we intend to be limited only by the following claims:

1. A process for the preparation of a β-chloro ethane sulfonate which comprises fusing carbyl sulfate with a salt selected from the class consisting of the alkali metal chlorides and ammonium chloride and thereafter neutralizing the fused reaction mass with a compound selected from the class consisting of the alkali metal, alkaline earth metal, and ammonium hydroxides, oxides, and carbonates, the molar ratio of salt to carbyl sulfate being at least about 1:1.

2. A process as in claim 1 wherein the salt is sodium chloride and the neutralizing compound is sodium hydroxide.

3. A process as in claim 1 wherein the carbyl sulfate and sodium chloride are fused at a temperature between about 190–195° C.

4. A process for the preparation of sodium β-chloro ethane sulfonate which comprises fusing molten carbyl sulfate with sodium chloride and thereafter neutralizing the fused reaction mass with a compound selected from the class consisting of the hydroxides, the oxides, and the carbonates of sodium, the molar ratio of salt to carbyl sulfate being at least about 1:1.

5. The process of claim 4 wherein the neutralizing compound is sodium hydroxide.

6. A process as in claim 1 wherein the salt is potassium chloride and the neutralizing compound is potassium hydroxide.

References Cited in the file of this patent
UNITED STATES PATENTS
2,036,249    Adams et al. _____ Apr. 7, 1936